Figure 1:
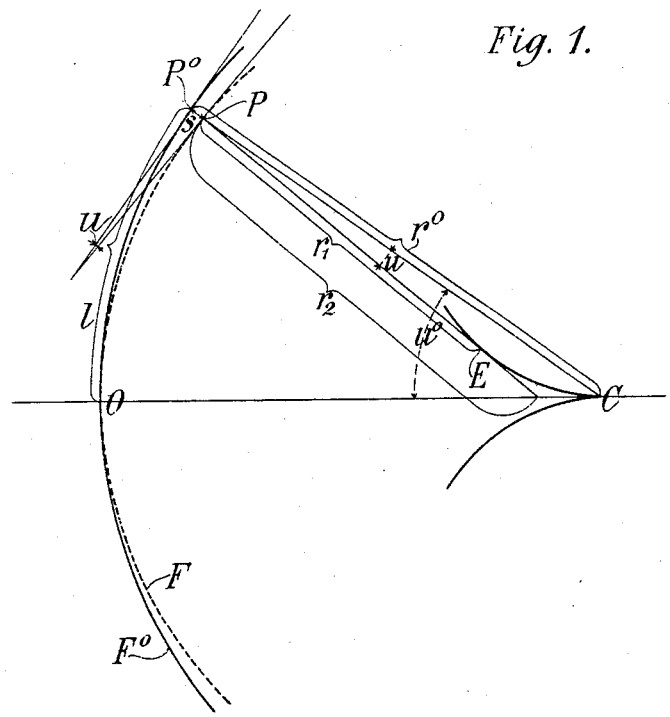

No. 697,959. Patented Apr. 22, 1902.
E. ABBE.
LENS SYSTEM.
(Application filed Nov. 23, 1899.)

(No Model.) 2 Sheets—Sheet 1.

Witnesses:
Emil Dinitz
Paul Krüger

Inventor
Ernst Abbe

No. 697,959.　　　　　　　　　　E. ABBE.　　　　　　Patented Apr. 22, 1902.
LENS SYSTEM.
(Application filed Nov. 23, 1899.)

(No Model.)　　　　　　　　　　　　　　　　　　　　　2 Sheets—Sheet 2.

Witnesses:　　　　　　　　　　　　　　　　　　　Inventor.

UNITED STATES PATENT OFFICE.

ERNST ABBE, OF JENA, GERMANY, ASSIGNOR TO THE FIRM OF CARL ZEISS, OF JENA, GERMANY.

LENS SYSTEM.

SPECIFICATION forming part of Letters Patent No. 697,959, dated April 22, 1902.

Application filed November 23, 1899. Serial No. 738,053. (No model.)

*To all whom it may concern:*

Be it known that I, ERNST ABBE, doctor of philosophy, a subject of the Grand Duke of Saxe-Weimar-Eisenach, residing at Jena, in the Grand Duchy of Saxe-Weimar-Eisenach, German Empire, have invented a new and useful Lens System, of which the following is a specification.

The invention relates to optical lens systems; and it consists in a means for more perfectly correcting such systems in cases where a strict union of rays is required not only in the axis, or, practically spoken, for a comparatively small field, but also beside the axis—that is to say, for image-points at a comparatively great distance from the axis—the latter correction of oblique rays comprising flattening of the image and removing of astigmatism, of distortion, and of coma produced by oblique pencils. To attain the said improved correction, spheroidal surfaces, either refracting or reflecting, are substituted for or combined with the ordinary spherical surfaces. These spheroidal surfaces are surfaces of revolution the axes of which coincide with the axis of the system, and they differ only slightly from exact spherical surfaces, although their curvatures are continuously varying from the vertex to the periphery in a predetermined manner.

Surfaces of revolution differing from the spherical shape are already well known in optical systems, such surfaces being, for instance, the parabolic mirror-surfaces of the reflecting-telescopes and the so-called "aplanatic" lens-surfaces. Moreover, surfaces of revolution which have not a strictly spherical figure are employed—unintentionally and in most cases unconsciously—in telescopic objectives, as it is usual to improve the correction of spherical aberration in objectives of this kind by repolishing single zones of an originally-spherical lens-surface. In all these cases the deviation from the spherical shape serves for no other purposes but to correct spherical aberration, and particularly not for the purpose of improving those deficiencies of reproduction (astigmatism, coma, &c.) which are the peculiar features of oblique pencils, because in said cases the principal rays intersect each other in or near the vertex of the spheroidal surface, (the lens-opening itself representing the pupil of entrance and the mounting of the lens the aperture-diaphragm,) so that all rays, central as well as oblique ones, pass through the same parts of the spheroidal surface, and in consequence thereof an oblique pencil issuing from an eccentric point of the object-surface cannot be otherwise modified by the said surface than the central pencil. On the contrary, by the present invention optical systems are improved in which—as, for instance, in eyepieces and in photographic objectives—the pupil of entrance or emergence (the place of the aperture-diaphragm) is situated at a less or greater distance from at least one of the lens-surfaces, so that the pencils issuing from lateral object-points traverse these surfaces at other parts than the pencil of the axial object-point.

The object of the invention is to derive advantage as to correction of oblique pencils from the said difference, causing a deviation from the spherical shape to act on oblique pencils otherwise than on the central one.

Figure 2:
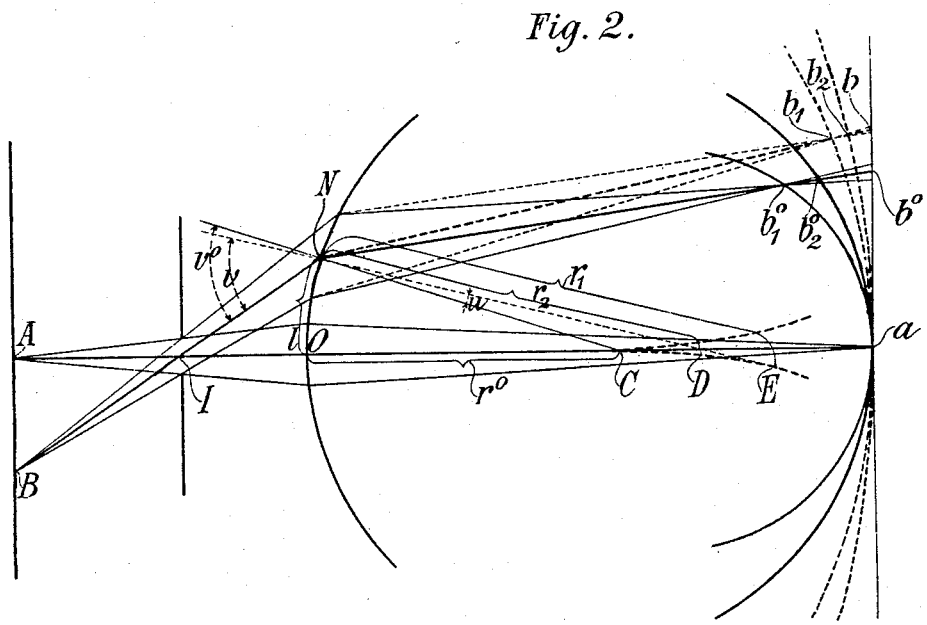
Figure 3:
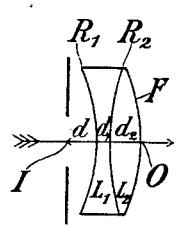
Figure 4:
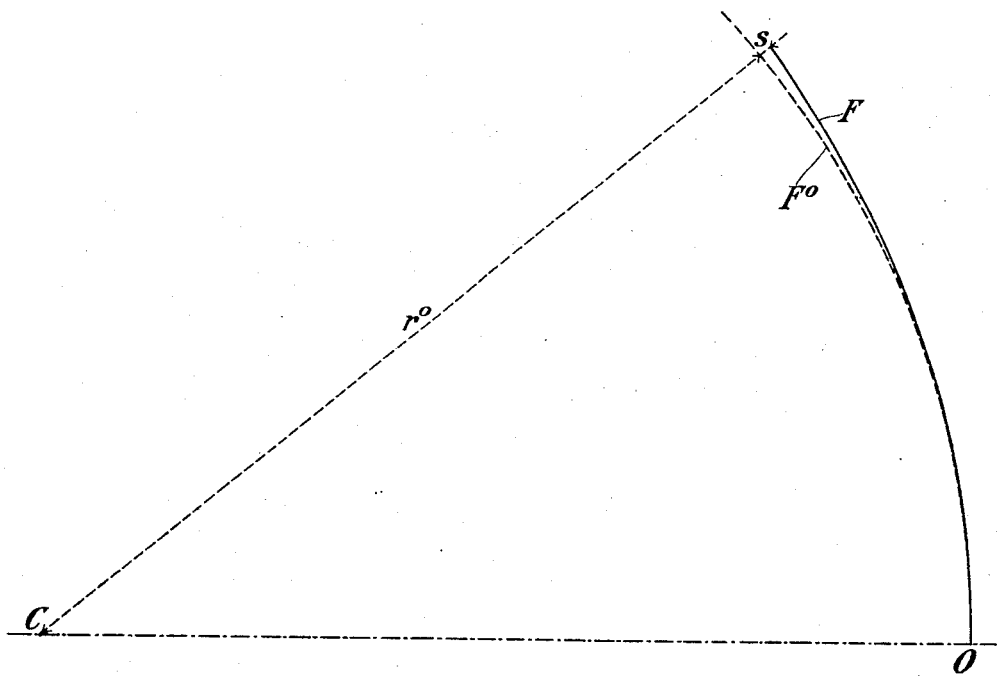

In the annexed drawings, Figure 1 is a diagram showing the relation between a spheroidal surface and a spherical surface osculating the first in its vertex. Fig. 2 is a diagram showing how a suitable spheroidal refracting-surface substituted for a spherical one improves the qualities of the image beside the axis in a system in which the refracting-surface is situated behind the so-called "pupil of incidence." Fig. 3 represents a lens system constructed according to the invention. Fig. 4 represents, on an enlarged scale, part of the spheroidal surface used in the system shown in Fig. 3.

I. A spheroidal surface having the above-stated qualities may be defined as follows: Let the distance of any point P of a spheroidal surface (represented in its meridional section by the dotted curve F) from a spherical surface (represented by the circular arc $F^0$) osculating the vertex of the spheroidal one be $PP^0 = s$. The direction of the line $s$ is identical to that of the radius which belongs to the point $P^0$ of the spherical surface, and the length of this line may be determined as a function of the arc $OP^0 = l$, which corresponds to the center angle $u^0$. To each point P of the spheroidal surface corresponds an angle $u$, formed by the normal of this point and the radius $r^0$ of the point $P^0$ of the spherical surface, which radius passes through the same point P. Furthermore, to each point P belong two radii of principal curvature, $r_1$ relating to the plane of the meridional section or primary plane and $r_2$ relating to the secondary plane perpendicular to the first and including the normal. The radius $r_2$ of the secondary plane is, as the spheroidal surface is supposed to be, a surface of revolution equal to the length of the normal from point P up to the axis of revolution, while the radius $r_1$ of the meridional section is equal to the length of the normal from point P up to the point E, where it touches the evolute C E of the meridional curve. Not only the distance $s$, but also the angle $u$ and the radii $r_1$ and $r_2$ (or the curvatures $\rho_1$ and $\rho_2$ reciprocal to the said radii) may be represented as functions of the arc $l$, so that the spheroidal surface may be defined by any one of these functions.

As may be inferred from the term "spheroidal surface," the linear deviation $s$ of such a surface from the osculating spherical surface is very small as compared with the radius $r^0$ of the latter, so that the higher powers of the quotient $\frac{s}{r^0}$ may be neglected. Then there are the following relations (which may be easily derived) between the four magnitudes $s\ u\ \rho_1\ \rho_2$, supposed to be functions of the arc $l$.

$$u = \frac{ds}{dl}; \quad s = \int_0^l u\, dl;$$

$$\rho_1 = \frac{1}{r^0} + \frac{du}{dl} + \frac{s}{r^{02}} = \frac{1}{r^0} + \frac{d^2s}{dl^2} + \frac{s}{r^{02}};$$

$$\rho_2 = \frac{1}{r^0} + \frac{u}{r^0\, tg\, u^0} + \frac{s}{r^{02}} = \frac{1}{r^0} + \frac{\frac{ds}{dl}}{r^0\, tg\, u^0} + \frac{s}{r^{02}};$$

$$\rho_1 - \rho_2 = \frac{d^2s}{dl^2} - \frac{\frac{ds}{dl}}{r^0\, tg\, u^0};$$

wherein $u^0 = \frac{l}{r^0}$.

If the values of the arc $l$ do not exceed a certain limit, the deviation $s$ may be represented with any desired approximation by the following function:

$$s = \tfrac{1}{4} k\, l^4 + \tfrac{1}{6} m\, l^6 + \tfrac{1}{8} n\, l^8 + \ldots,$$

and it follows after the integration necessary according to the above formula for $u$:

$$u = k\, l^3 + m\, l^5 + n\, l^7 + \ldots$$

Therefore the shape of any spheroidal surface may be univocally determined by radius $r^0$ in the vertex and by a certain number of coefficients $k, m, n \ldots$ and it may be determined in a first approximation by $r^0$ and the coefficient $k$ of the first term only, whereby the above-stated formulæ are simplified as follows:

$$s = \tfrac{1}{4} k\, l^4;$$

$$u = k\, l^3;$$

$$\rho_1 = \frac{1}{r^0} + 3\, k\, l^2 + \tfrac{1}{4}\frac{k\, l^4}{r^{02}};$$

$$\rho_2 = \frac{1}{r^0} + \frac{k\, l^3}{r^0\, tg\, u^0} + \tfrac{1}{4}\frac{k\, l^4}{r^{02}} = \frac{1}{r^0} + \frac{k\, u^0\, l^2}{tg\, u^0} + \tfrac{1}{4}\frac{k\, l^4}{r^{02}}.$$

II. On the basis of the preceding geometric definitions the essential features of the invention will now be explained. For this purpose the image of a plane object may be considered as projected by a refracting lens-surface, the aperture-diaphragm being placed at a distance from this surface, so that the principal rays of the pencils issuing from the object-points intersect the axis not in the vertex of the lens-surface, but in a point before or behind this surface. Then the points of the object-plane are reproduced by different elements of the lens-surface.

In Fig. 2, A B be the plane object, and O the vertex of a refracting-surface. This surface is supposed at first to be spherical, the radius being $r^0$. C be the center of the said spherical surface, and I be the point where the principal rays intersect the axis (where the aperture-diaphragm surrounds the so-called "pupil of incidence" for the refracting-surface.) The rays which issue from the object-point A on the axis will be monocentrically united in the image-point $a$, likewise on the axis. The position of this point $a$, as well as the ratio of the sizes of image and object in proximity to the axis, are, according to the fundamental formulæ of dioptrics, fully determined by the distance A O, the radius of the spherical surface $C\, O = r^0$, and the refractive indices of the media before and behind this surface.

The pencil of rays issuing from an eccentric point B of the object-plane and including the principal ray B I N is refracted by the spherical surface, so that this principal ray is deflected toward a point $b^0$ of the supposed image-plane, (the position of which is given by the axial image-point $a$,) and the rays of the pencil instead of meeting accurately in one point of the deflected principal ray $N b^0$ produce, on account of their anacentricity, two image-lines perpendicular to each other and at two different points $b^0_1$ and $b^0_2$ of the said principal ray. In the points $b^0_1$ all rays traveling in the primary plane and in the point $b^0_2$ all rays traveling in the secondary plane (and represented in Fig. 2 by the principal ray $N b^0$ itself) are united.

The pencil of rays in consideration does not produce in the image-plane a sharp image point, but an elliptical figure of diffusion, the center of which is the point $b^0$.

With the conditions supposed in Fig. 2—viz., collective refraction producing a real image—the distances $N b^0{}_1$ and $N b^0{}_2$ are, as is well known, smaller than the distance $N b^0$, and $N b^0{}_1$ is still smaller than $N b^0{}_2$, so that two curved image-surfaces are formed, (which turn their concavities toward the object plane,) and the oblique pencils possess anastigmatic difference which increases with their angle of inclination to the axis. Moreover, the ratio $\frac{a b^0}{A B}$, which defines the linear magnification of the image, is smaller than the corresponding ratio in proximity to the axis—that is to say, the distortion of the image is "barrel-shaped." Now let a spheroidal surface be substituted for the spherical one. The curvature of the substitute surface be in its vertex the same as that of the spherical surface, ($r^0 = C O$,) while it continuously decreases toward the periphery, so that the deviation of the spheroidal surface from the osculating sphere is contrary to that shown in Fig. 1. The curve C E be the evolute of the meridional section of the spheroidal surface. Then for the point of incidence N the normal coincides with the direction of the tangent N E, the radius of curvature $r_1$ relative to the primary plane is equal to N E, and the radius of curvature $r_2$ relative to the secondary plane is equal to N D, both distances exceeding the length $r^0$. Such spheroidal deformation of the surface originally supposed to be spherical does not alter the position of the axial image point $a$ nor the magnification in proximity to the axis; but it modifies the ratio of magnification as to the image parts beside the axis in such a way that the barrel-shaped distortion is diminished. As the present angle of incidence $v$ of the principal ray B I is by the amount of $u$ smaller than the former angle of incidence $v^0$, (relating to the spherical surface,) the said principal ray now is less deflected, so as to intersect the image plane at a point $b$, which is more distant from the axis than the point $b^0$. Therefore the ratio of magnification $\frac{a b}{A B}$ surpasses the ratio $\frac{a b^0}{A B}$ and approaches more than the latter the ratio which takes place in proximity to the axis.

The spheroidally-deformed refracting-surface acts on the rays, in the primary as well as in the secondary plane, as would act a spherical surface of a diminished curvature, as both $r_1$ and $r_2$ have a greater length than $r^0$. In consequence thereof the points of union $b_1$ and $b_2$ (primary and secondary foci) approach, as compared with the points $b^0{}_1$ and $b^0{}_2$, respectively, the image plane $a b$, so that both image-surfaces are flatter than before. Moreover, the astigmatic difference in the oblique pencil is reduced, because according to the formulæ given in section I $r_1 - r^0$ is always greater than $r_2 - r^0$, the ratio of both differences being approximately three to one, so that the points $b_1$ and $b_2$ approach each other.

At last the aberration of the oblique pencil called "coma" is diminished by the above spheroidal deformation of the refracting-surface, as from the decrease of curvature toward the periphery a negative value of the differential quotient $\frac{d \rho_1}{d l}$ results, which reduces the increase of the angle of incidence toward the periphery.

If the spheroidal deformation of the original spherical surface is opposite to that mentioned in the description of Fig. 2—i. e., similar to that shown in Fig. 1—while the other circumstances are the same as in Fig. 2, its effects are contrary to those just described.

The formulæ for exact computation of the effects mentioned will contain the values of the coefficients $k\, m\, n$ .... which determine the spheroidal form. (See section I.) These formulæ may be easily deduced from well-known dioptric theorems.

III. In consequence of the foregoing the following statement is justified: If a lens system of any composition whatsoever be given which—like a photo-objective or a telescopic eyepiece—forms the image of a definite object through the action of different parts of its effective aperture, and if—every one of its surfaces being supposed strictly spherical—certain deficiencies of the oblique pencils—such as distortion, curvature of field, astigmatism, coma—are not properly corrected it will always be possible to correct one, and in general only one, of these deficiencies (at any rate for image-points of a certain distance from the axis) by spheroidal deformations of one surface. Therefore it will only be possible, in general, to correct at the same time 2 3 ... aberrations by 2 3 ... spheroidal surfaces, if no deformation of a single surface can be found equivalent to two or more of the spheroidal surfaces. The latter equivalent substitution is only possible if the principal ray of the pencil meets two or more surfaces at nearly the same distance from the axis—for instance, when both surfaces are adjacent with only a small interval. No effect whatever as to the aberrations of oblique pencils will result by deforming such surfaces which are traversed by the principal rays near the vertex. In consequence of these two facts a better correction of the oblique pencils may only be arrived at by spheroidal deformations of such surfaces which are properly distant from each other and from the point in which the principal rays traverse the axis of the system.

It will be understood that the spheroidal deformation of a surface, while leaving unaltered the axial image-point and the axial magnification has its effect on the spherical aberration of the direct pencil. This effect depends upon the value of $\frac{d^2 \rho_1}{d l^2}$ in the ver-
tex, or, according to the formula in section I, in a first approximation upon the value of the coefficient $k$. In the case of a system to be corrected not only for the oblique pencils but also for the direct pencil the spheroidal deformations have to be properly chosen, so that the spherical aberrations of the direct pencil, taking into account the coefficients of deformation belonging to the different surfaces, compensate each other. In general this last requirement diminishes the possibility of correcting the oblique pencils; but it is certainly possible, at any rate in some systems, to correct by using deformed spheres not only the oblique pencils but also the direct one, even in a higher degree than it would prove possible by employing spherical surfaces only.

The use of the new means described above for the correction of the aberrations of oblique pencils simplifies the construction by reducing the number of surfaces, and thereby of component lenses, because a spheroidally-deformed surface presents more independent elements for correction than a sphere. These deformed surfaces present, as far as practical working is concerned, the advantage that the correcting effects described in section II take place even if the deviations from the sphere are very small. A peripheral deviation of a few hundredths of a millimeter will sufficiently alter, in a lens of forty to fifty millimeters diameter, the curvatures $\rho_1 \rho_2$ in the primary and secondary planes of the pencils of extreme obliquity, so as to produce a material displacement of the two foci and a marked diminution of their astigmatic difference.

It will be understood that the novel correcting means for oblique pencils does not apply to such aberrations of these pencils the value of which depends on the first power of the angle formed by the principal ray and the axis of the system, for it follows from well-known propositions of dioptrics that, whatever be the figure of the refracting-surfaces, all aberrations of oblique pencils which stand not in proportion to the second or any higher power of the said angle of inclination are, just like the aberrations of the axial pencil, not altered by varying the distance between the lens-surfaces and the point where the principal rays intersect the axis. Therefore to remove, according to the invention, this point of intersection from the spheroidal surface will have no correcting effect as to all oblique pencils which belong to image-points near the axis, so that their spherical aberration is still identical with that of the axial pencil, and their coma is determined by the so-called "sine" condition. It follows from this statement that the invention relates only to such optical systems the image-field of which extends to a greater distance from the axis to a distance where the angle of inclination between the principal ray and the axis is wide enough so that its second and higher powers have noticeable values.

The non-spherical surfaces hitherto in use in optical systems were applied to telescopic objectives and reflectors for the purpose of correcting spherical aberration or for the purpose of meeting the sine condition. As the telescopic field of image is very narrow, it will be understood from this extrinsic circumstance that those spheroidal surfaces do not touch the sphere of the present invention, which is restricted to optical systems of a wide angle of image.

As an example of an optical system improved according to the invention a photographic lens system which includes one spheroidal surface is represented in Fig. 3—viz., a single landscape-lens free from spherical aberration and having an anastigmatically-flattened field, the aperture-diaphragm being arranged in front of it. Up to this date the construction of such lenses was rather complicate. Binary lenses being out of question, three or four, or even five, components were cemented together to meet the said requirements of correction. In the example shown it was possible to restrict the optical means to a binary cemented lens the astigmatic correction of which is of the same order as in the merely spherical systems having a greater number of elements, whereas the spherical zones are even smaller. The following data define this lens for a focal length of one hundred and twenty-four millimeters:

*Radii:*

$R_1 = 17.3$.
$R_2 = 24.86$.

*Distance and Thicknesses:*

$d = 2.9$.
$d_1 = 1.2$.
$d_2 = 3.0$.

*Kinds of Glass:*

| | $L_1$ | $L_2$ |
|---|---|---|
| $n_D$ | 1.52034 | 1.59133 |
| $n_{G1}$ | 1.53322 | 1.60362 |

Lens diameter: 14.5.

F is the meridional section of the spheroidal surface, this surface being defined by the radius $r^0 = 18.05$ of the great circle $F^0$ of the osculating sphere and by the coefficient $k = -0,000044$. To make visible the distances $s = \frac{1}{4} k l^4$, part of the curve F, together with a corresponding arc of the circle $F^0$, is represented in Fig. 4 on a scale five times as large as that of Fig. 3.

What I claim as my invention, and desire to secure by Letters Patent, is—

In lens systems for producing optical images of wide angle the combination with an aperture-diaphragm of a lens having a surface of revolution, the curvature of which surface gradually varies from the vertex to the margin, and which surface is so distant from the center of the aperture-diaphragm that it is traversed by the oblique pencils at other parts than by the axial pencil, substantially as described.

In testimony whereof I have hereunto set my hand in the presence of two subscribing witnesses.

ERNST ABBE.

Witnesses:
PAUL TEICHMANN,
FRITZ SCHNELL.